A. L. HITE.
REEL FOR ELECTRIC WIRE CONNECTIONS.
APPLICATION FILED MAY 23, 1919.
1,397,633.
Patented Nov. 22, 1921.
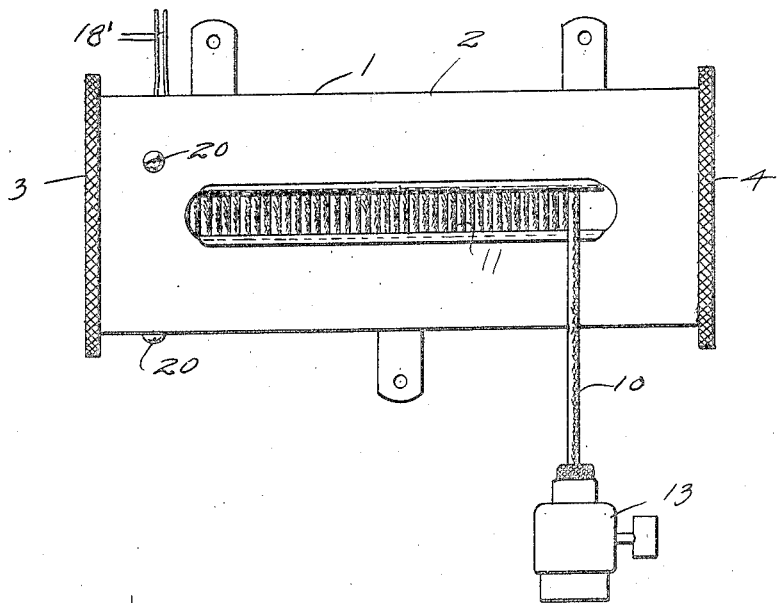
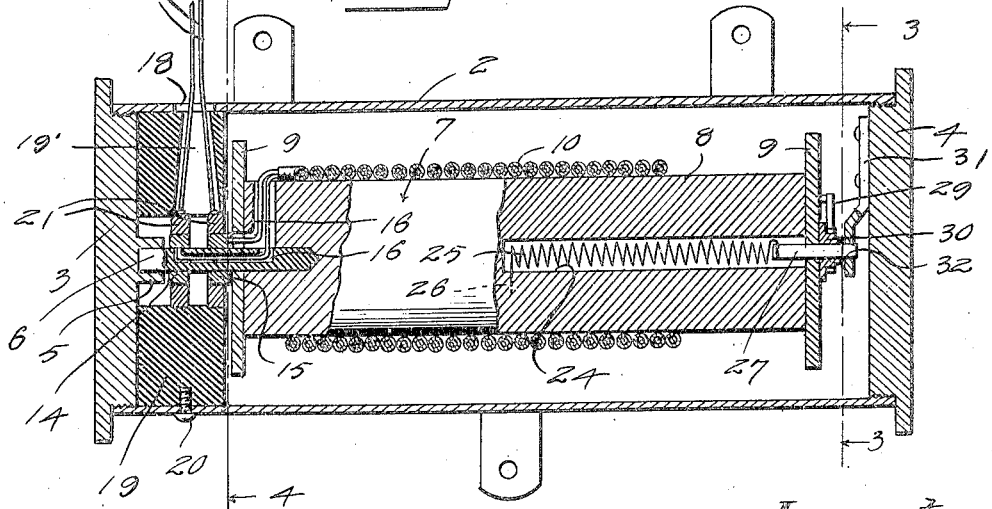
Inventor
A. L. Hite A. L. HITE.
REEL FOR ELECTRIC WIRE CONNECTIONS.
APPLICATION FILED MAY 23, 1919.
1,397,633.
Patented Nov. 22, 1921.
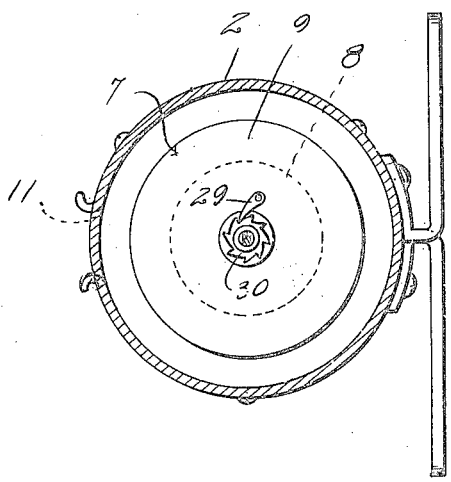
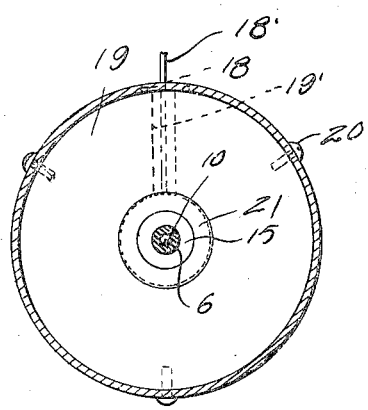
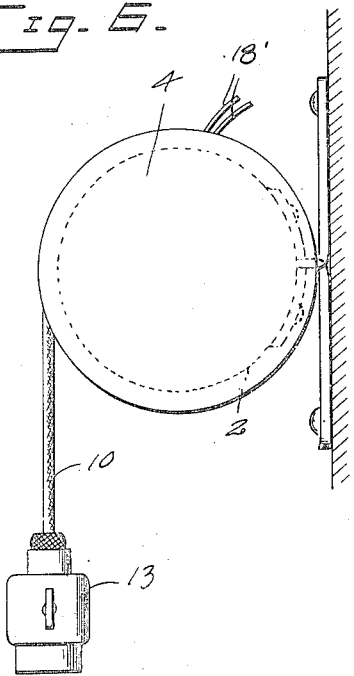
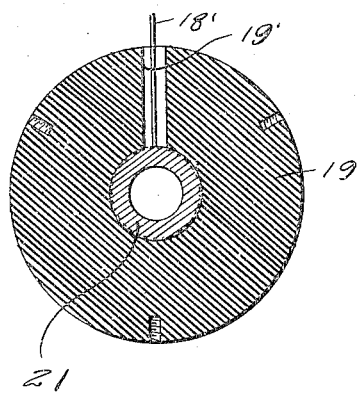
Inventor
A. L. Hite

UNITED STATES PATENT OFFICE.

ALVA L. HITE, OF POMEROY, OHIO.

REEL FOR ELECTRIC-WIRE CONNECTIONS.

1,397,633.  Specification of Letters Patent.  Patented Nov. 22, 1921.

Application filed May 23, 1919. Serial No. 299,109.

*To all whom it may concern:*

Be it known that I, ALVA L. HITE, a citizen of the United States, residing at Pomeroy, in the county of Meigs and State of Ohio, have invented certain new and useful Improvements in Reels for Electric-Wire Connections; and I do hereby declare the following to be a full, clear, and exact description of the invention, such as will enable others skilled in the art to which it appertains to make and use the same.

This invention relates to reels for electric wire connections, and the primary object of the invention is to provide an improved reel for the reception of the cord of an extension electric light, so that the light can be readily moved to any desired place or position where a bright light is desired, such as in making repairs to various parts of automobiles or the like.

A further object of the invention is to provide an improved reel adapted to take up the slack for the feed wires of all electrical translating devices, the reel being adapted to be secured in any desirable place.

A further object of the invention is to provide an improved reel for automatically winding the feed wire and to provide a protecting housing for the same, when not in use.

A further object of the invention is to provide an improved means for electrically connecting the terminal of the feed wire to the reel, so that a steady current may be obtained during the winding and unwinding of the feed wires from the reel.

A still further object of the invention is to provide an improved device of the above character which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a front elevation of the improved device,

Fig. 2 is a longitudinal section through the same,

Fig. 3 is a transverse section taken on the line 3—3 of Fig. 2,

Fig. 4 is a transverse section taken on the line 4—4 of Fig. 2,

Fig. 5 is a detail view, of the block carried by the casing for receiving the line wires, Fig. 6 is a side elevation of the improved device secured in operative position.

Referring to the drawings in detail, wherein similar reference characters designate corresponding parts throughout the several views, the numeral 1 generally indicates the improved device, which includes the substantially cylindrical hollow casing 2 having its ends closed by removable caps 3 and 4. The caps 3 and 4 are threaded into engagement with the cylindrical casing or may be held in engagement with the same by frictional contact. The inner surface of the cap 3 is provided with a central bearing 5 which rotatably receives the outer end of the shaft 6 carried by the reel 7 which is arranged in the casing. The reel 7 includes the cylindrical body 8, having the annular flanges 9 formed on the terminals thereof, which prevent the feed wires 10 from slipping off of of the same during the winding and unwinding operation. The feed wire 10 extends outward of the casing and through a longitudinally extending slot 11 formed in the front face of the same. The upper and lower edges of the slot 11 is provided with arcuate outwardly extending flanges which form a guide for the feed wire. The outer terminals of the feed wires carry the lamp socket 13, or any other suitable socket, whereby the feed wires may be attached to a suitable electrical appliance. The shaft 6 extends outward from the end of the reel and the same is formed from some suitable nonconducting material, and has secured thereto spaced annular contact metallic members 14 and 15, and the terminals of the feed wires 10 extend through recesses 16 formed in the body of the reel and the shaft 6 and are secured to the contact members 14 and 15. The rear end of the casing 2 is provided with an opening 18, through which extend the line wires 18' which have their inner terminals secured to the annular contact members 21 carried in the annular block 19, as later described. The annular block 19 snugly fits in the casing 2 and is held in position by means of screws or other fastening elements 20. The annular block 19 is formed of suitable nonconducting material and the inner surface thereof is provided with spaced annular contact members 21, which are adapted to rotatably receive the contact members 14 and 15 carried by the shaft.

The terminals of the line wires 18 are passed through the block and are electrically connected to the contacts 21. Thus it will be seen that during the winding and unwinding of the feed wires 16, the members 14 and 15 will contact with the line wires.

The body 8 of the reel is provided with an inwardly extending central bore 24, in which is positioned a coil spring 25, which has the inner end thereof secured to the wall of the bore, as at 26. The outer end of the bore rotatably receives a stub shaft 27, the inner end of which has secured thereto the outer end of the coil spring 28. The outer face of the reel carries the pivoted dog 29, which is adapted to engage the ratchet 30 formed on the stub shaft 27, so as to hold the cord in its adjusted position.

The cap 4 has secured thereto the bracket 31 which has a non-circular opening 32 formed therein, for snugly receiving the end of the shaft 27 so as to hold the same against rotation.

From the foregoing description, it can be seen that an improved reel is provided for receiving the cords of electrical translating devices, so that the same may be readily moved from one place to another.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

A reel for electric wire connections comprising a stationary casing, means for mounting said casing on a stationary support, said casing having removable caps on its opposite ends, said casing being of cylindrical form in cross section and having an aperture for the passage of a conductor leading to a translating device, a stub shaft fixed to one of the caps, a drum having one end rotatably mounted on said shaft, spring means connecting the drum and shaft, an insulating plate having a central aperture and secured in one end of said casing between the other of said caps and the adjacent end of the drum, spaced electrical conducting collars carried in said aperture, spaced contact members mounted on a stub shaft of insulating material fixed to said drum and engaging the spaced electrical conducting collars, an electric cord wound on said drum and connected to the spaced contact members, said insulating member and said casing having registering openings leading to said spaced electrical conducting collars, and electric feed wires extended through said registering openings and connected with said spaced electrical conducting collars.

In testimony whereof I affix my signature in presence of two witnesses.

ALVA L. HITE.

Witnesses:
   A. P. MILLER,
   DAVID GEYEN.